A. M. DRAKE.
ADJUSTABLE SHAFT BEARING.
APPLICATION FILED JUNE 13, 1916.
1,210,280.
Patented Dec. 26, 1916.
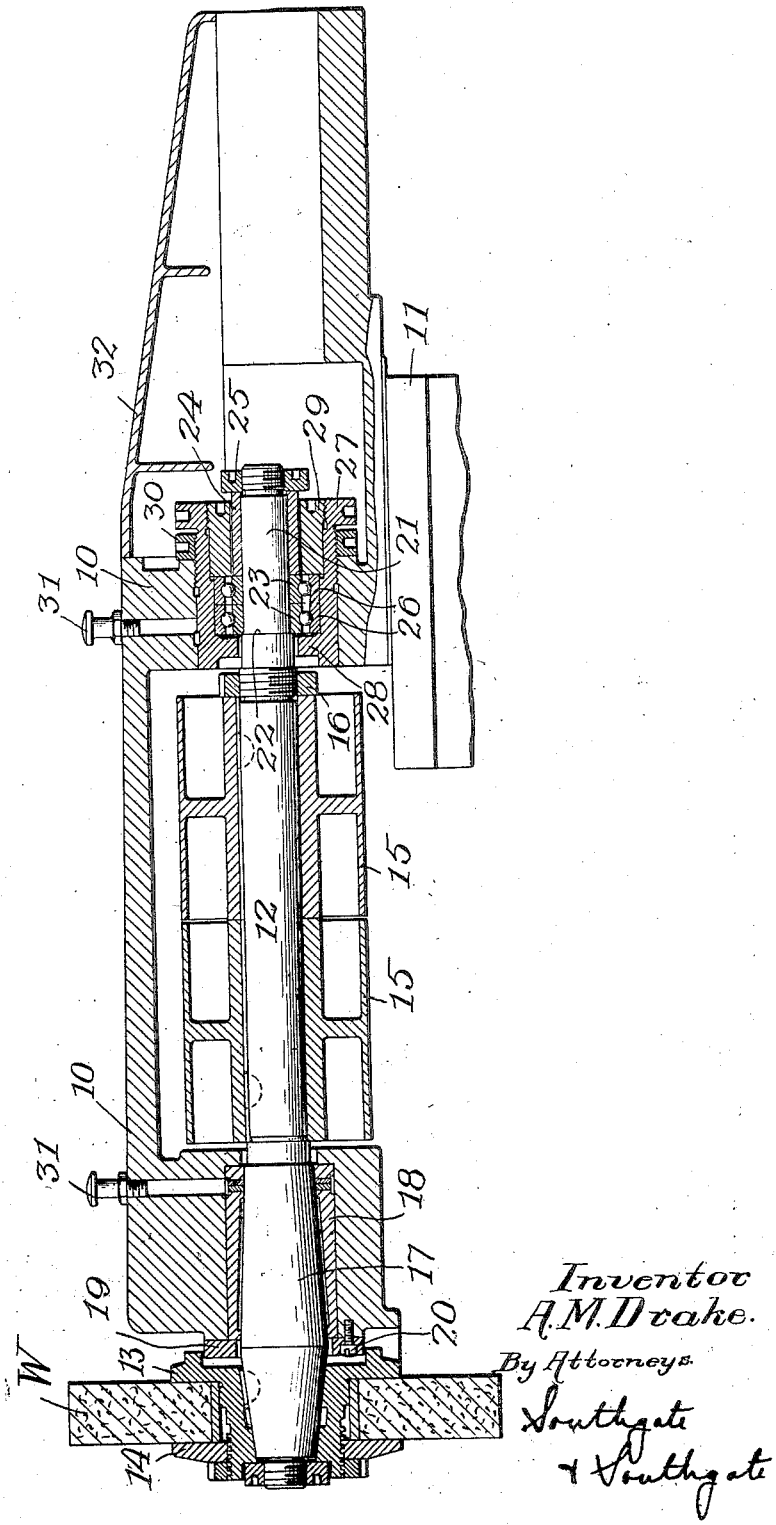
Inventor
A. M. Drake.
By Attorneys
Southgate
& Southgate

UNITED STATES PATENT OFFICE.

ALDEN M. DRAKE, OF WORCESTER, MASSACHUSETTS, ASSIGNOR TO HEALD MACHINE COMPANY, OF WORCESTER, MASSACHUSETTS, A CORPORATION OF MASSACHUSETTS.

ADJUSTABLE SHAFT-BEARING.

1,210,280. Specification of Letters Patent. Patented Dec. 26, 1916.

Application filed June 13, 1916. Serial No. 103,569.

*To all whom it may concern:*

Be it known that I, ALDEN M. DRAKE, a citizen of the United States, residing at Worcester, in the county of Worcester and State of Massachusetts, have invented a new and useful Adjustable Shaft-Bearing, of which the following is a specification.

This invention relates to a compound or two-part shaft bearing capable of general application and including provision for the adjustment of the end play of the supported shaft.

The invention is shown herein as embodied in the wheel head of a grinding machine in which it supports the grinding wheel shaft, a combination in which objectionable end play must be absolutely avoided.

It is the principal object of my invention to improve and simplify the construction of bearings of this type, with resulting economy of manufacture and increased efficiency of operation.

Further objects of my invention relate to the provision of a convenient adjustment of the bearings for the taking up of end play, and to the removal of the adjusting devices from proximity to the grinding wheel.

To the attainment of these objects I provide a plain non-adjustable tapered bearing adjacent the grinding wheel and I provide a longitudinally adjustable bearing, herein shown as a ball bearing, for the opposite end of the wheel shaft.

My invention further relates to certain arrangements and combinations of parts which will be hereinafter described and more particularly pointed out in the appended claims.

A preferred form of my invention is shown in the drawing which is a sectional side elevation of a grinding wheel head with my improved bearing embodied therein.

The wheel head 10 may be of any usual type and is slidable longitudinally in ways formed on the supporting bed 11. The wheel shaft 12 is horizontally supported in the head 10 and the wheel W is carried by the wheel shaft at its left-hand end (as viewed in the drawing) the wheel being clamped between a sleeve 13 and a disk 14 and the sleeve 13 being rigidly secured to the tapered outer end of the shaft 12. Pulleys 15 are keyed to the shaft 12 and are secured in position by a clamping nut 16 which forces the pulleys against a shoulder on the shaft.

At its left-hand end the shaft 12 is provided with a tapered bearing portion 17 rotatable in a tapered bearing sleeve 18 which is seated in a recess in the head 10 and is retained in position therein by a cap 19 and screws 20. At its right-hand end the shaft 12 is provided with a straight cylindrical portion 21 and a shoulder 22. This end of the shaft is supported in ball bearings, the inner races 23, 23 of which are clamped against the shoulder 22 by a sleeve 24 and nut 25. The outer races 26, 26 are slidable in a sleeve 27 and are forced tightly against an inwardly projecting portion 28 of said sleeve by a binding nut 29 which is threaded into the sleeve. The sleeve 27 is also threaded on a portion of its outer cylindrical surface, the threads thereon fitting corresponding threads formed in the head 10. A check nut 30 is provided for locking the sleeve 27 in the desired position in the head 10. Suitable oiling devices 31, 31 are mounted upon the head and a movable cover plate 32 affords convenient access to the rear bearing for adjustment thereof.

Having thus described my invention the advantages thereof will be readily apparent. In a grinding machine the principal bearing strain occurs adjacent the grinding wheel and this strain is herein received by the plain tapered bearing 18 which is adapted to severe service and which may be easily replaced when necessary. This bearing contains no small or delicate parts and is admirably fitted for heavy duty. The ball bearing at the right-hand or rear end of the shaft provides a support for the shaft and also constitutes a thrust bearing for controlling the end play of the shaft. To adjust the bearings it is merely necessary to loosen the check nut 30 and to turn the sleeve 27 in one direction or the other to tighten or loosen the bearing, after which adjustment the check nut is tightened to lock the parts in position. This is an exceedingly simple operation and the change in adjustment may be very quickly made. The removal of the adjusting mechanism from the vicinity of the grinding wheel and work is of particular advantage.

Having thus described my invention it will be evident that changes and modifications can be made therein by those skilled in the art without departing from the spirit and scope thereof as set forth in the appended claims and I do not wish to be otherwise limited to the details herein disclosed but

What I claim is:—

1. In a grinding machine, the combination of a rotatable shaft, a supporting frame, a tapered main bearing for said shaft non-adjustably fixed in said frame, and a take-up bearing for the opposite end of said shaft, said take-up bearing comprising a threaded sleeve longitudinally adjustable in said frame and having provision at its outer end for adjustment thereof, an outer ball race, means accessible from the outer end of said bearing for securing said race in said sleeve, an inner ball race, means at the end of said shaft for securing said race to said shaft, and a series of balls in said races.

2. In a grinding machine, in combination, a shaft, a frame member, a tapered main bearing for said shaft and a take-up bearing for said shaft, said latter bearing comprising an inner ball race fixed to said shaft, an outer ball race mounted in a sleeve, a series of balls in said races, and means for adjusting said sleeve in said frame member, whereby the end play of said shaft may be controlled.

3. In a grinding machine, in combination, a frame member, a shaft, a tapered bearing for said shaft and a take-up bearing for said shaft, said bearings being separated and said latter bearing comprising an inner ball race fixed to said shaft, a sleeve threaded in said frame member, an outer ball race fixed in said sleeve, and a series of balls in said races, angular adjustment of said sleeve being effective to positively control the end play of said shaft in said frame member.

In testimony whereof I have hereunto set my hand.

ALDEN M. DRAKE.